United States Patent [19]
Rieffle

[11] 4,316,053
[45] Feb. 16, 1982

[54] PIPE COUPLINGS AND COUPLING GASKETS

[75] Inventor: Paul F. Rieffle, Pittsburgh, Pa.

[73] Assignee: Coupling Systems, Inc., Pittsburgh, Pa.

[21] Appl. No.: 77,794

[22] Filed: Sep. 24, 1979

[51] Int. Cl.³ .............................................. H01R 4/64
[52] U.S. Cl. ................................. 174/84 S; 285/174;
 285/369; 285/422; 285/DIG. 11; 277/235 R
[58] Field of Search ................. 285/337, 45, 369, 413,
 285/372, DIG. 11, 305, 104, 105, 318, 422, 244,
 174; 174/78, 84 S, 91; 277/235 R, 105, 144, 153,
 163, 164; 403/368, 372

[56] References Cited

U.S. PATENT DOCUMENTS

| 1,984,806 | 12/1934 | Pfefferle | 285/DIG. 11 |
| 2,346,051 | 3/1944 | Seamark | 285/104 X |
| 3,078,332 | 2/1963 | Marx | 285/369 X |
| 3,213,187 | 10/1965 | Kish | 285/45 |
| 3,259,406 | 7/1966 | Kish | 174/84.5 |

FOREIGN PATENT DOCUMENTS

| 533423 | 11/1956 | Canada | 277/235 |
| 663954 | 5/1963 | Canada | 285/369 |
| 2752761 | 5/1979 | Fed. Rep. of Germany | 285/318 |

*Primary Examiner*—Dave W. Arola
*Attorney, Agent, or Firm*—Buell, Blenko, Ziesenheim & Beck

[57] ABSTRACT

A pipe coupling and gasket is provided in which electrical conductivity through the coupling is assured, said coupling consisting of a middle ring with conical ends receiving an annular resilient gasket having a conductive helix made from metal wire of triangular cross section with an apex on the periphery of the helix, end caps urging the gasket into the conical ends of the middle ring and compression means acting on the end rings to move them toward the middle ring to compress the gasket and engage the helix against the middle ring, the end caps and a pipe therein.

7 Claims, 7 Drawing Figures

U.S. Patent     Feb. 16, 1982     4,316,053
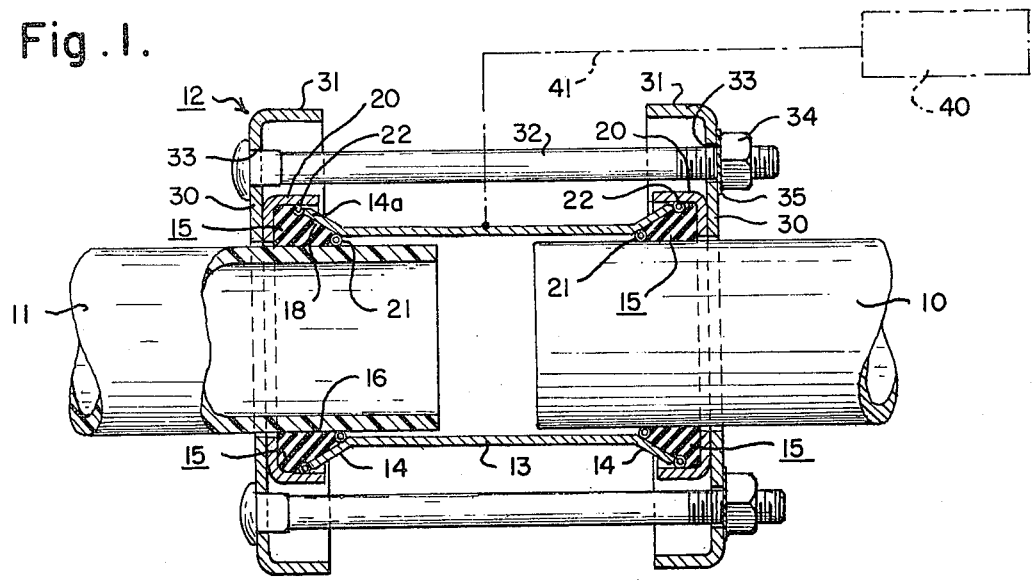
Fig. 1.
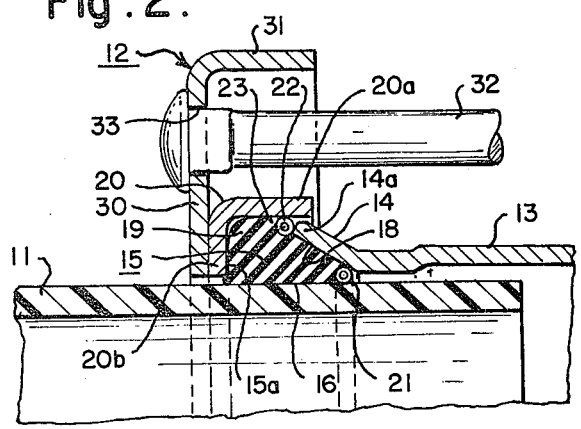
Fig. 2.
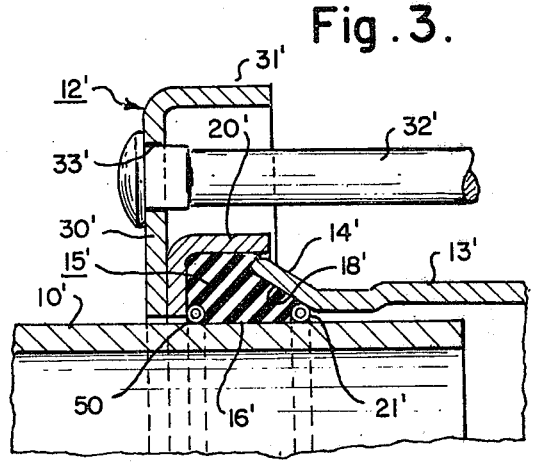
Fig. 3.
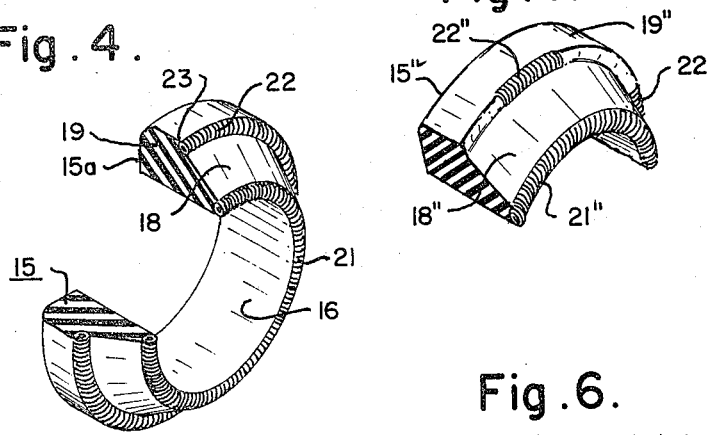
Fig. 4.    Fig. 7.    Fig. 5.
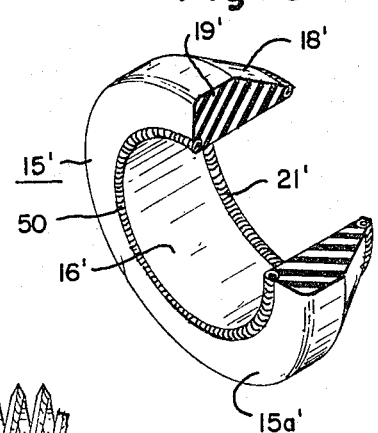
Fig. 6.

PIPE COUPLINGS AND COUPLING GASKETS

This invention relates to pipe couplings and coupling gaskets and particularly to a pipe coupling and gasket in which electrical continuity between all metal parts of the coupling is assured.

Pipe couplings incorporating rubber gaskets have long been known and used. One of the problems which is inherent in prior art gaskets is the lack of electrical continuity between the several parts making up the coupling because the rubber gaskets act as an insulator between the various separate metal parts. The problem has long been recognized and various proposals for insuring electrical continuity have been made. Typical of such prior art proposals is that appearing in Kish U.S. Pat. No. 3,213,187 where a conductor wire is welded to the sleeve with ends extending out to and welded to the two end caps and the whole is preassembled as a unit. This structure, of course, has many obvious drawbacks. First, it requires preassembly and can only be used in preassembled condition otherwise it requires removing the wire ends from the end caps. It requires the extra assembly expense of the added wire. It remains effective only so long as the wire remains attached and intact.

Applicant has discovered a solution to the problem of electrical continuity in couplings which eliminates all of these problems. Applicant's solution is simple, inexpensive and adds no parts to the standard coupling of the industry.

Applicant has discovered that, by using a conductive wire helix or similar conductive resilient member partially embedded in the rubber gasket between the sleeves and end cap at least two of the junction of the sleeve and pipe end and gasket, or the sleeve end cap and gasket, or the end cap, pipe end and gasket, one can obtain electrical conductivity if the conductive helix is so arranged that a substantial portion of it is exposed from the rubber and above the surface of the rubber gasket so that it can make contact. This requires that the helix or other member be sufficiently large and placed so that it extends above the adjacent rubber surfaces when installed and that following embedding in the rubber that it be cleaned of any rubber covering by wire brushing or the like. A wire helix has long been inserted in the apex areas of rubber sealing gaskets and packing materials to protect the gasket against disintegration by attacking liquids as in U.S. Pat. Nos. 1,984,806 and 3,213,187, but it has never been recognized that this same helix, if installed as described above, so that a substantial portion was exposed above the rubber surfaces and freed of rubber coating, would solve the problem of electrical continuity and thus eliminate the need for a separate wire as used in U.S. Pat. No. 3,213,187 and others.

Applicant provides a pipe coupling having an elongate cylindrical sleeve having an inner diameter sufficient to permit insertion of the ends of two pipes to be coupled, an annular recess at each end of said sleeve, an annular resilient gasket at each recess adapted to fit around the pipe ends being joined and to fit within said recess with a portion extending axially out of said recess, said axially extending portion having a radial shoulder axially aligned with the end of said sleeve, an end cap at each end of said sleeve, said end caps having an annular skirt portion encircling said axially extending portion of said gasket and the end of the sleeve and spaced from the sleeve and an end wall portion surrounding the pipe ends being joined and adapted to press axially on the gasket, compression means acting on said end caps to compress the resilient gaskets sealingly into said annular recesses and against the pipe ends being joined, a metallic conductive helix in each said gasket at a junction of the gasket with the pipe end and sleeve, said helix having an exposed portion free of said resilient gasket and making electrical contact between said pipe end and sleeve and resilient conductor means in at least one of junction of an end cap, the sleeve and a radial shoulder and a junction of the gasket with the pipe end and end cap, said conductor means having exposed portions free of said resilient gasket and making electrical contact between at least one of said sleeve and end cap and said pipe end and end cap. Preferably, the conductive means in the shoulder and junction of the gasket with the pipe end and end cap is a metallic conductive helix. The metallic conductive helix is in every case preferably formed by winding a helix of cartridge brass of triangular cross section with an apex of the triangle on the outer periphery of each wrap of said helix. Preferably, the conductive helix is in each case molded into a corner or apex of the resilient gasket so that a substantial portion of the metal helix is exposed above the adjacent surfaces of the gasket. The recess in each end of the sleeve is preferably frusto conical in form as is the resilient gasket which fits therein. The compression means is preferably a plurality of bolts extending between radial ears on the two end caps.

In the foregoing general description, I have set out certain objects, purposes and advantages of my invention. Other objects, purposes and advantages of this invention will be apparent from a consideration of the following description and the accompanying drawings in which:

FIG. 1 is a longitudinal section through a coupling of this invention connecting the ends of a steel pipe to the end of a plastic pipe;

FIG. 2 is an enlarged fragmentary section of a coupling end and gasket particularly for use with either plastic pipe or steel pipe;

FIG. 3 is an enlarged fragmentary section of a coupling end and gasket particularly for use with steel pipe;

FIG. 4 is an isometric view, partly in section of a gasket as used in FIGS. 1 and 2;

FIG. 5 is an isometric view partly in section of a gasket as used in FIG. 3;

FIG. 6 is a longitudinal side elevation, partly in section of a fragment of metallic helix as used in this invention; and FIG. 7 is a fragmentary isometric view of a second embodiment of gasket for use in connecting plastic pipe.

Referring to the drawings, I have illustrated in FIG. 1 a steel pipe end 10 and a plastic pipe end 11 being joined in end-to-end relation by a coupling 12 according to this invention. Coupling 12 is made up of a generally cylindrical sleeve 13 having flared frusto conical ends 14 at each end. Sleeve 13 is long enough to extend over the two pipe ends 10 and 11 to be joined in usual manner. A resilient rubber seal ring 15, having a central annular opening 16 adapted to slide snugly over a pipe end 10 or 11 to be joined and a frusto conical face 18 adapted to fit within the frusto conical ends of sleeve 13, is provided in each end 14 of sleeve 13. Resilient seal rings 15 have a generally cylindrical backup portion 19 whose diameter is slightly larger than the external diameter of the end 14 of sleeve 13 and is adapted to fit in end cap 20. A helix of cartridge brass 21 is embedded in seal 15 at the intersection of annular opening 16 and frusto conical face 18. This helix is arranged so that a substantial portion of its external surface is exposed out of the rubber and the external surface is cleaned of all covering rubber so that on insertion it engages between pipe end 10 and 11 and sleeve 13 in electrical contact so that in the case of a metal pipe 10 there is electrical continuity between pipe end 10 and sleeve 13 through helix 21. A like helix 22 is embedded in shoulder 23 between frusto conical face 18 and back-up portion 19 of the seal ring. Again, the helix 22 must be of such size and arrangement that a substantial portion of its external surface is exposed above the adjacent rubber and is cleaned of all covering rubber so that on assembly the coupling electrical contact is made between the end 14a of frusto conical end 14 of the sleeve 13 and the end cap 20. Thus, complete continuity is established between the sleeve 13 and end caps 20 and, in the case of a metal pipe, the metal pipe end 10. Each of the end caps is of generally cap shape having a skirt portion 20a surrounding gasket portion 19 and an end wall portion 20b pressing axially against the end 15a of seal ring or gasket 15. An outer back-up ring 30 having axially extending ears 31 is attached by welding or the like coaxially to end cap 20. Bolts 32 extend through opening 33 in ears 31 from one back-up ring 30 to another on the opposite side of the coupling. Nuts 34 and locking star washers 35 are attached to the ends of the bolts and tightened to compress the seal rings 15 between frusto conical end 14 of the sleeve 13, pipe ends 10 and 11 and end caps 20 and to force helix 21 into tight electrical contact between pipe end 10 and sleeve 13 and helix 22 into tight electrical contact between the end 14a of sleeve 13 and end cap skirt 20a. At the same time the bolt provides electrical conductivity between the end caps 20 through back-up ring 30. In the case where the coupling is isolated by use on plastic pipe, it may be attached to a buried magnesium electrode 40 by line 41 fixed to the coupling, for example, to the center of sleeve as shown in chain line in FIG. 1.

Since most couplings are protected by a protective coating such as paint, I have found it desirable to make the helix 21 and helix 22 of triangular cross section cartridge brass as illustrated in FIG. 6, with an apex on the outside periphery of the helix. The apex of the helix thus acts as a cutting edge which readily penetrates the paint or other protective coating. If the coating is relatively soft, the helix may be of circular cross section cartridge brass or like spring-like metal which will penetrate the coating to complete the electrical circuit.

In FIG. 3 I have illustrated another embodiment of my invention which is adapted for use in adjoining two ends of metal pipe together. It is not satisfactory for joining plastic pipe ends. In this embodiment like elements with those of FIGS. 1 and 2 are given like numbers with a prime sign. The only difference between the two embodiment lies in the omission of helix 22 and the addition of another helix 50 in the resilient ring 15' at the junction of ring 15' with pipe end 10' and end cap 20'. By this means, electrical conductivity through the coupling is by way of sleeve 13', helix 21', pipe 10', helix 50, end cap 20', back-up ring 30' and bolts 32'.

A modification of the ring seal of FIG. 4 is illustrated in FIG. 7 in which only segments of helix 22'' are spaced apart around the shoulder of part 19'' of ring seal 15''. The helix 21'' must be continuous because it not only acts as a conductor but also to protect the rubber edge of the ring, even though now exposed, as was the case in the earlier patents mentioned above.

In the foregoing specification I have set out certain preferred practices and embodiments of my invention; however, it will be understood that this invention may be otherwise embodied within the scope of the following claims.

I claim:

1. A pipe coupling providing electrical continuity between all parts thereof comprising an elongate cylindrical conductive sleeve having an inner diameter sufficient to permit insert of the ends of two pipes to be coupled, an annular recess at each end of said sleeve, an annular resilient gasket at each recess adapted to fit around the pipe ends being joined and substantially within said recess with a portion extending axially from said recess, said axially extending portion having a radial shoulder generally axially aligned with the end of said sleeve, a conductive end cap at each end of said sleeve, said end caps having an annular skirt portion encircling said axially extending portion of said gasket and the end of said sleeve and spaced from said sleeve and an end wall portion surrounding the pipe ends being joined and pressing axially on the gasket, compression means acting on said end caps to compress the resilient gasket sealingly into said annular recesses and against the pipe ends being joined, a metallic conductive helix made from metal wire, said wire being of triangular cross section with an apex on the external periphery of the helix in each gasket at a junction of the gasket with the pipe end and sleeve, said helix having a substantial exposed portion free from said resilient gasket and making electrical contact with said sleeve and adjacent pipe end and resilient conductor means in at least one of the junction of an end cap, the sleeve and a radial shoulder on said gasket and a junction of the gasket with the pipe end and end cap, said conductive means having substantial exposed portions free of said resilient gasket and making electrical contact between at least one of said sleeve and end cap and said end cap and pipe end.

2. A coupling as claimed in claim 1 wherein the conductive helix is molded into one of an edge and apex of the resilient gasket so that a substanital portion of the helix is normally exposed above the adjacent surfaces of the gasket.

3. A coupling as claimed in claim 1 wherein the helix is made up of cartridge brass.

4. A coupling as claimed in claim 3 wherein the conductive helix is molded into one of an edge and apex of the resilient gasket so that a substantial portion of the helix is normally exposed above the adjacent surfaces of the gasket.

5. A gasket for pipe couplings having a conductive elongate sleeve with a recess at each end adapted to receive the ends of two pipes to be coupled, a pair of end caps at each end of the sleeve and a resilient gasket at each recess adapted to fit the pipe ends being joined, the improvement comprising said resilient gasket fitting substantially within said recess and having a portion extending axially from said recess, said axial portion having a radial shoulder generally axially aligned with the end of said sleeve, a metallic helix made from metal wire, said wire being of triangular cross section with an apex on the external periphery of the helix at a junction of the gasket with the pipe end and sleeve, said helix having a substantial exposed portion free from said resilient gasket and adapted for making electrical contact with said sleeve and adjacent pipe end and resilient conductor means in at least one of junction of an end cap, the sleeve and said radial shoulder on said gasket and a junction of the gasket with a pipe end and end cap, said conductive means having exposed portions free from said resilient gasket and adapted for making contact between at least one of said sleeve and end cap and said end cap and pipe end.

6. A gasket as claimed in claim 5 wherein the helix is cartridge brass.

7. A gasket as claimed in claim 5 wherein the conductive helix is molded into one of an edge and apex of the resilient gasket so that a substantial portion of the helix is normally exposed above the adjacent surfaces of the gasket.

* * * * *

UNITED STATES PATENT AND TRADEMARK OFFICE
CERTIFICATE OF CORRECTION

PATENT NO. : 4,316,053

DATED : February 16, 1982

INVENTOR(S) : PAUL F. RIEFFLE

It is certified that error appears in the above-identified patent and that said Letters Patent are hereby corrected as shown below:

Column 1, line 34, "at least" should read --at at least--.

Signed and Sealed this

Twenty-second Day of June 1982

[SEAL]

Attest:

GERALD J. MOSSINGHOFF

Attesting Officer — Commissioner of Patents and Trademarks